United States Patent
Menezes et al.

(10) Patent No.: US 11,269,817 B2
(45) Date of Patent: Mar. 8, 2022

(54) SYSTEM AND METHOD FOR EFFICIENTLY MEASURING PHYSICAL SPACE FOR AN AD-HOC SUBSET OF FILES IN PROTECTION STORAGE FILESYSTEM WITH STREAM SEGMENTATION AND DATA DEDUPLICATION

(71) Applicant: EMC IP Holding Company LLC, Hopkinton, MA (US)

(72) Inventors: Guilherme Menezes, Santa Clara, CA (US); Fabiano Botelho, San Ramon, CA (US); Abdullah Reza, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 267 days.

(21) Appl. No.: 16/380,815

(22) Filed: Apr. 10, 2019

(65) Prior Publication Data
US 2019/0236054 A1 Aug. 1, 2019

Related U.S. Application Data

(63) Continuation of application No. 14/871,109, filed on Sep. 30, 2015, now Pat. No. 10,303,662.

(51) Int. Cl.
*G06F 16/00* (2019.01)
*G06F 16/182* (2019.01)
(Continued)

(52) U.S. Cl.
CPC ...... *G06F 16/1844* (2019.01); *G06F 11/1451* (2013.01); *G06F 11/1456* (2013.01);
(Continued)

(58) Field of Classification Search
None
See application file for complete search history.

(56) References Cited

U.S. PATENT DOCUMENTS 7,668,119 B2 * 2/2010 Thubert ................. H04L 45/46
370/256
8,204,868 B1 6/2012 Wu
(Continued)

FOREIGN PATENT DOCUMENTS

WO 2008/008183 A2 1/2008

OTHER PUBLICATIONS

U.S. Appl. No. 14/871,109, filed Sep. 30, 2015, Menezes et al.
(Continued)

*Primary Examiner* — Jean M Corrielus
(74) *Attorney, Agent, or Firm* — Workman Nydegger

(57) ABSTRACT

In one example, a method includes measuring an amount of physical storage space used, or expected to be used, by a portion of a dataset S of segments, and measuring the amount of physical storage space includes receiving information that identifies an ad-hoc group of size 'n' of files $F_1 \ldots F_n$ that makes up a subset of the dataset S, determining a number of unique segments in the dataset S, identifying a respective unique segment set $U_{F1} \ldots U_{FN}$ for each of the 'n' files in the ad-hoc group of files, performing a set union operation on the unique segment sets $U_{F1} \ldots U_{FN}$, and determining a sum of sizes of the unique segment sets $U_{F1} \ldots U_{FN}$, where the sum is the amount of physical storage space used or expected to be used by the ad-hoc group of size 'n' of files $F_1 \ldots F_n$.

18 Claims, 5 Drawing Sheets

(51) Int. Cl.
  *G06F 11/14* (2006.01)
  *G06F 16/11* (2019.01)
  *G06F 16/9535* (2019.01)
  *G06F 16/174* (2019.01)

(52) U.S. Cl.
  CPC ........ *G06F 11/1464* (2013.01); *G06F 16/125* (2019.01); *G06F 16/1748* (2019.01); *G06F 16/9535* (2019.01); *G06F 2201/84* (2013.01)

(56) References Cited

U.S. PATENT DOCUMENTS

| | | | | |
|---|---|---|---|---|
| 8,370,315 | B1* | 2/2013 | Efstathopoulos | G06F 16/174 |
| | | | | 707/696 |
| 8,397,080 | B2 | 3/2013 | Lu | |
| 8,572,055 | B1 | 10/2013 | Wu | |
| 8,612,696 | B2 | 12/2013 | Zhu et al. | |
| 8,635,184 | B2 | 1/2014 | Hsu et al. | |
| 8,700,578 | B1* | 4/2014 | Varadan | G06F 16/174 |
| | | | | 707/692 |
| 8,886,605 | B1* | 11/2014 | Wu | G06F 16/1748 |
| | | | | 707/639 |
| 8,983,952 | B1* | 3/2015 | Zhang | G06F 11/00 |
| | | | | 707/736 |
| 9,110,792 | B1 | 8/2015 | Douglis | |
| 9,201,949 | B2 | 12/2015 | Xie | |
| 9,298,726 | B1 | 3/2016 | Mondal | |
| 9,367,557 | B1 | 6/2016 | Lin | |
| 9,370,315 | B2 | 6/2016 | Schmale | |
| 9,411,815 | B1 | 8/2016 | Lu | |
| 9,424,185 | B1 | 8/2016 | Botelho | |
| 9,679,040 | B1* | 6/2017 | Davis | G06F 16/1827 |
| 9,703,796 | B2 | 7/2017 | Kumar | |
| 9,715,434 | B1 | 7/2017 | Xu | |
| 9,898,478 | B2* | 2/2018 | Vijayan | G06F 16/256 |
| 10,346,297 | B1* | 7/2019 | Wallace | G06F 3/0641 |
| 10,430,383 | B1* | 10/2019 | Menezes | G06F 16/1734 |
| 10,459,648 | B1* | 10/2019 | Menezes | G06F 3/065 |
| 2010/0318759 | A1* | 12/2010 | Hamilton | G06F 11/1456 |
| | | | | 711/171 |
| 2011/0099200 | A1* | 4/2011 | Blount | G06F 16/152 |
| | | | | 707/770 |
| 2012/0030477 | A1 | 2/2012 | Lu | |
| 2012/0150826 | A1* | 6/2012 | Vijayan Retnamma | |
| | | | | G06F 16/22 |
| | | | | 707/692 |
| 2013/0297656 | A1 | 11/2013 | Wang | |
| 2013/0318051 | A1 | 11/2013 | Kumar | |
| 2014/0324880 | A1 | 10/2014 | Xie | |
| 2015/0154220 | A1* | 6/2015 | Ngo | G06F 16/178 |
| | | | | 707/609 |
| 2015/0161194 | A1 | 6/2015 | Provenzano | |
| 2015/0205815 | A1* | 7/2015 | Vijayan | G06F 16/137 |
| | | | | 707/692 |
| 2016/0078068 | A1* | 3/2016 | Agrawal | G06F 16/215 |
| | | | | 707/692 |
| 2017/0315876 | A1 | 11/2017 | Dornquast | |
| 2018/0075055 | A1* | 3/2018 | Ngo | G06F 16/178 |
| 2018/0314566 | A1* | 11/2018 | Stocker | G06F 9/5066 |
| 2019/0129887 | A1* | 5/2019 | Bowman | H05K 999/99 |
| 2019/0171563 | A1* | 6/2019 | Wallace | G06F 3/0641 |

OTHER PUBLICATIONS

U.S. Appl. No. 14/871,109, Mar. 8, 2018, Office Action.
U.S. Appl. No. 14/871,109, Oct. 17, 2018, Final Office Action.
U.S. Appl. No. 14/871,109, Feb. 6, 2019, Notice of Allowance.

\* cited by examiner

SYSTEM AND METHOD FOR EFFICIENTLY MEASURING PHYSICAL SPACE FOR AN AD-HOC SUBSET OF FILES IN PROTECTION STORAGE FILESYSTEM WITH STREAM SEGMENTATION AND DATA DEDUPLICATION

RELATED APPLICATIONS

This application is a continuation of, and hereby claims priority to, U.S. patent application Ser. No. 14/871,109, entitled SYSTEM AND METHOD FOR EFFICIENTLY MEASURING PHYSICAL SPACE FOR AN AD-HOC SUBSET OF FILES IN PROTECTION STORAGE FILESYSTEM WITH STREAM SEGMENTATION AND DATA DEDUPLICATION, and filed Sep. 30, 2015. All of the aforementioned applications are incorporated herein in their respective entireties by this reference.

FIELD OF THE INVENTION

Embodiments of the present invention generally concern data backup and restoration. More particularly, at least some embodiments of the invention relate to systems, hardware, computer-readable media, and methods directed to measuring the physical space occupied by any ad-hoc subset of files in a file system.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

While data backup is a valuable and important function, the ever increasing volume of data that is generated presents significant problems. In particular, many companies today find their backup and recovery process strained as data growth in enterprise IT environment continues to accelerate at exponential rates, while data-protection solutions have struggled to keep pace.

At least some of the problems encountered in data backup systems and methods concern the amount of physical storage space occupied by data that has been, or will be, stored in the backup system. In particular, there may be a need to be able to determine the amount of physical storage space occupied by the stored data. However, it has proven difficult to make such determinations in some environments, particularly those environments where data stream segmentation and data deduplication are performed.

For example, one specific problem is the inability to measure physical storage space consumed by any ad-hoc user-specified subset of the files in a file system with data deduplication. In such systems, one file may be split into hundreds of millions of segments during the write process. Moreover, these segments may be shared across the newly written file and any other file(s) of the system. The following example helps to illustrate some of the problems encountered in this area.

The physical space of a file F can be denoted as physical_space(F). In such systems, the following will always be true for a file F1 and a file F2:

physical_space(F1)+physical_space(F2)≥physical_space({F1, F2})

That is, the physical space of F1 and F2 measured together may be smaller than the physical space of F1 measured in isolation plus the physical space of F2 measured in isolation. This is true because F1 and F2 may share segments, which may be deduplicated during the write process. However, the physical space for the shared segments should be accounted only once during the physical space measurement process. If the physical space for the shared segments is measured more than once, the physical space measurement for F1 and F2 will be inaccurate, that is, too high.

In light of problems and shortcomings such as those noted above, it would be useful to be able to efficiently measure the physical storage space consumed by an ad-hoc subset of files in a data protection system. As well, it would be useful to be able to measure physical storage space consumed by an ad-hoc subset of files that have been segmented and deduplicated. Finally, it would be useful to be able to determine, with respect to an ad-hoc subset of files, the set of unique segments shared across the files in that subset.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
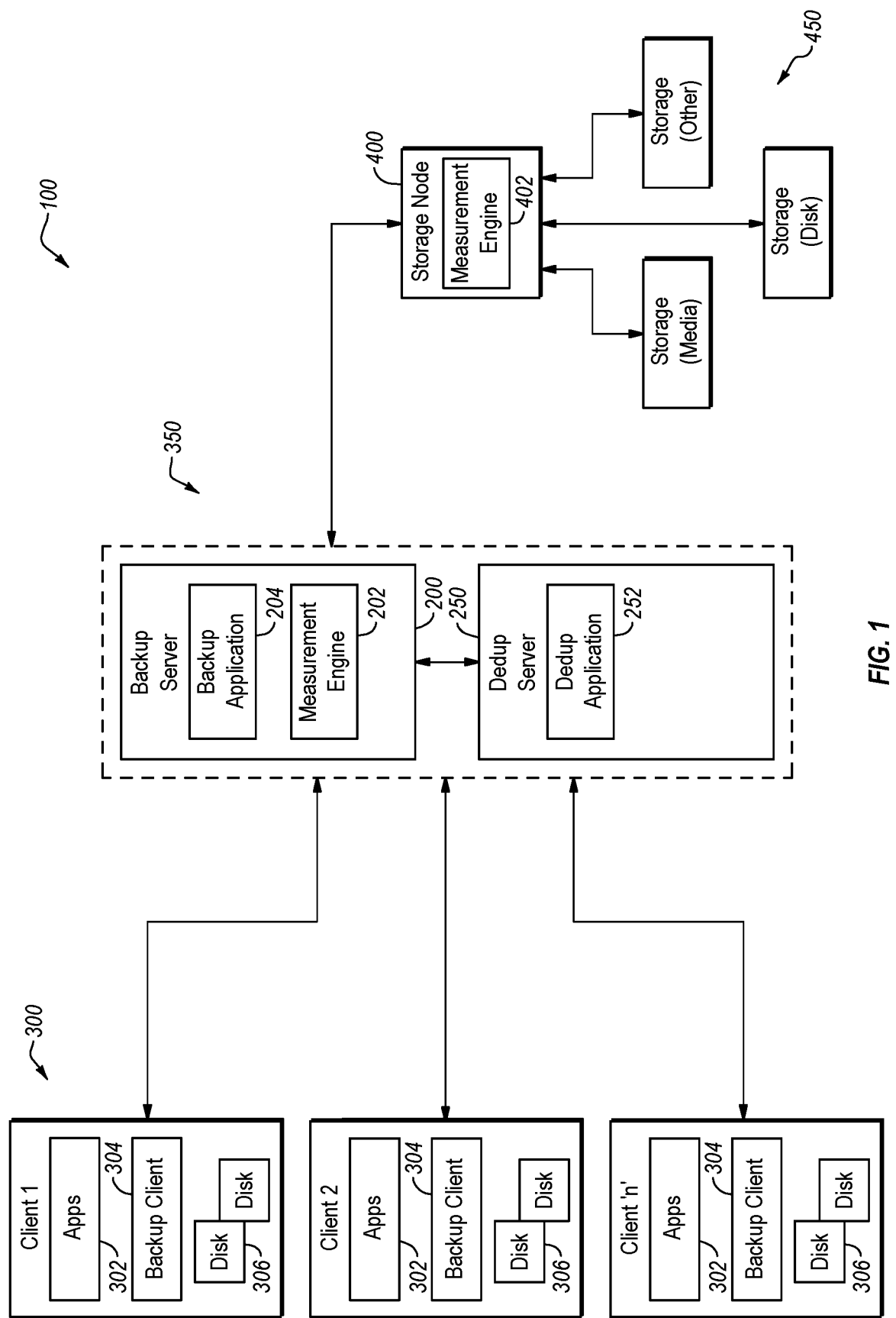
FIG. 1 discloses aspects of various example operating environments for at least some embodiments.

At least some embodiments of the invention relate to systems, hardware, computer-readable media, and methods directed to measuring the physical space occupied by any ad-hoc subset of files in a file system. As well, processes and methods for measuring the physical space can be performed in a variety of computing environments including, but not limited to, environments where data stream segmentation and/or data deduplication is/are performed.

With respect to the present disclosure, it should be understood that the term 'backup' as used herein is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection. The physical space measurements disclosed herein can be performed with respect to data that has been deduplicated and/or compressed.

In at least some implementations, computing the physical space occupied by an ad-hoc subset of files involves the use of a method for accurately tracking the unique segments shared across the files in that subset. Such a method can involve, for example, representing in memory a set S of as many as hundreds of billions of segments or more, identifying in memory the number of unique segments inside the set of segments S, implementing in memory a set union operation on top of any number N of segment sets: $U_{\{F1, F2, \ldots, FN\}} = UF_1 \cup UF_2 \cup \ldots \cup UF_{FN}$, and computing in memory the sum of the sizes of the unique segments inside any, that is, ad-hoc, set of segments S.

Moreover, at least some embodiments of the method determine an average segment size for a file independently of the unique segment count for that file during a physical space computation. In some example embodiments, the average segment size can be the arithmetic mean of all the segments of the file, including the unique segments of the file. In other embodiments, only the unique segments are considered in determining the arithmetic mean segment size.

Because the number of segments involved can be quite large, embodiments of the invention can employ a statistical segment counting method. This statistical method can be used to estimate the number of segments using a very small amount of memory. More particularly, a statistical sampling method, which can involve the use of a bloom filter for example, is employed to estimate the number of unique segments. This statistical sampling method is constructed to reduce the size of in-memory representation, such as a bloom filter, while making sure that the number of unique segments is not underestimated and, in some embodiments at least, uses a content-based fingerprint value to sample segments. Some embodiments of the sampling method involve testing the sampling condition of all the fingerprints of a file F.

The segment fingerprints only need to be enumerated if the file F measurement has not already been cached. In this sense, the method is incremental in nature. Thus, whenever a measurement is made, only the new and modified files in the ad-hoc subset will be measured.

Among other things, the example method can allow for an efficient measurement of any point-in-time snapshot of the files in the file system. As well, the actual amount of data that will be stored is proportional to the number of sampled segments in a file.

As noted above, embodiments of the invention are able to efficiently compute the physical space measurement for any N ad-hoc subset of the files {F1,F2, . . . , FN} in a file system with stream segmentation and deduplication. Thus, one useful aspect of this functionality is the ability to calculate physical space measurements in an efficient way for any ad-hoc subset of files in a file system with stream segmentation and deduplication. Another useful aspect of embodiments of the invention is the ability to measure point-in-time physical space for any ad-hoc subset of files. Further, embodiments of the invention can provide the ability to reuse physical space measurements for files that have not changed since the last measurement.

As well, embodiments of the invention can provide a variety of functionalities relating to the storage and caching of measurements. In particular, embodiments can provide the ability to store/cache measurements in a file granularity, the ability to store/cache measurements in a very compact representation, and the ability to store/cache measurements in a space that is proportional to the size of the file, that is, smaller files need relatively less space to store the measurements.

A. Example Operating Environments

In general, embodiments of the invention may include and/or be implemented in an operating environment that includes one or more clients that include data that is desired to be protected in some way. The clients can communicate with a backup server and may include one or more applications which generate, and/or cause the generation of, data which is desired to be backed up for later restoration to the client and/or one or more other target machines. The clients and the target machines can be physical machines or virtual machines (VM), though neither type of machine is required for any embodiment. As used herein, the term 'data' is intended to be broad in scope and embraces, by way of example and not limitation, data segments such as may be produced by data stream segmentation processes, data chunks, data blocks, atomic data, emails, objects of any type, files, contacts, directories, volumes, and any group of one or more of the foregoing.

In at least some embodiments, the operating environment employs data stream segmentation and data deduplication processes. One particular example of an operating environment for embodiments of the invention is the EMC Corp. Data Domain deduplication storage system. However, the scope of the invention is not limited to that example environment. Data sources for the Data Domain environment, and other environments disclosed herein, include, but are not limited to databases, email servers, virtual machines (VM), file shares/servers, enterprise applications, and content management. Such environments also present a variety of backup use cases including, but not limited to, database, mainframe, IBMi, EMC Corp. Big Data, file/email, VMware, Network Attached Storage (NAS), and Remote Office Branch Office (ROBO). As well, example archive use cases include, but are not limited to, file/email, EMC Corp. Big Data, VMs, content management, storage tiering, and databases. The backed up data can form part of a disaster recovery (DR) system and can be stored on-premises and/or remotely, such as at one or more cloud locations for example.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. The operating environment 100 may include various devices including servers and other computing devices that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a backup server 200 configured for communication with a deduplication server 250, one or more clients 300, and a storage node 400 that may comprise an element of a cloud computing environment. The deduplication server 250 and backup server 200 may collectively define a data protection environment 350 although, as noted herein, the data protection environment 350 can take other forms as well. In at least some embodiments, the data protection environment 350 reside at a different physical location than the clients 300, although that is not required. It should be noted that, more generally, the data protection environment refers to any environment in which one or more data protection processes are partly or completely performed and, as such, the scope of the invention is not limited to the example of FIG. 1.

It should be noted that in addition to segmentation and deduplication, the data that is to be backed up can also be compressed. Such compression can take place at the backup server and/or the deduplication server, and/or at the storage node. Moreover, deduplication and compression can be performed in any order. For example, in some embodiments, the backup data is compressed before deduplication of that data is performed while, in other embodiments, the backup data is first deduplicated and then compressed.

In some embodiments, the respective functionalities of the deduplication server 250 and backup server 200 may be combined in a single server. For example, the deduplication server 250 may be omitted and deduplication processes performed by, and/or at the direction of, the backup server 200. Finally, the storage node 400, which may be a cloud storage node, can communicate with, or include, various types of storage 450, and the storage node 400 may include or be associated with a measurement engine 402, discussed in more detail below.

With continued reference to FIG. 1, backups of one or more of the clients 300 can, in general, be made by cooperation between the backup server 200 and the client 300, and the backups can then be stored by the backup server 200 at the storage node 400. Subsequently, one or more of the stored backups can be restored to one or more of the clients 300 and/or any other target(s). The backup server 200, deduplication server 250, clients 300, storage node 400 and/or target(s) may be physical machines, virtual machines (VM), or any other suitable type of device. As well, some or all of the storage 450 can be implemented as physical or virtual devices. Finally, while not specifically illustrated, the storage node 400 can include one or more database servers that communicate with one or more data stores. The database servers can store metadata, such as pointers for example, that point to data stored in the data store(s).

In one alternative to the arrangement of FIG. 1, the storage node 400 can be replaced with, or constitute, a primary storage device that communicates with the backup server 200. The backup server 200 may communicate with a data domain, which may incorporate the EMC Corp. DataDomain backup technology, that includes one or more storage devices where backups can be retrievably stored. The storage devices of the data domain can include, for example, an onsite retention storage device or array, and also an offsite disaster recovery (DR) storage device or array.

With particular reference first to the backup server 200, some embodiments may employ a backup server 200 in the form of an EMC Avamar server or NetWorker server, although the scope of the invention is not limited to those example servers. The backup server 200 includes a backup application 204 that participates in the generation of backups. Example implementations of the backup application 204 are discussed in more detail below.

One or more of the nodes, such as client 300, with which the backup server 200 communicates can take the form of a server. It is not required that the server be any particular type of server. One or more of the client(s) 300 include any of various applications 302 that generate data that is desired to be protected. As well, the client(s) 300 can each include a respective instance of a backup client 304 that generally operates in cooperation with the backup application 204 of the backup server 200 to create one or more backups that include data that is resident on storage media 306, such as disks for example, of the client 300. The backups thus created can be communicated to the storage node 400 for storage and subsequent retrieval.

With continued reference to the example operating environment 100 of FIG. 1, the data protection environment 350 may, as noted earlier, include a backup server 200 and deduplication server 250. In at least some embodiments, the data protection environment 350 is configured to communicate with a cloud storage environment which includes, or may consist of, the storage node 400. As such, deduplicated backups can be communicated by the data protection environment 350 to the storage node 400. The deduplicated backups can also be retrieved from the storage node 400 by the data protection environment 350 when there is a need to restore backup data to one or more targets, such as one or more of clients 300 for example.

In general, the deduplication server 250 includes a deduplication application 252 that performs deduplication services with respect to client 300 data that is to be backed up. The client 300 data that is to be deduplicated, which can take the form of one or more savesets for example, may be received by the deduplication server 250 from the backup server 200 although, as noted earlier, the deduplication server 250 can be omitted in some embodiments, in which case deduplication services are performed by the backup server 200. Creation of the backup and deduplication can be performed in any order. Thus, creation of the backup may be performed before, after, or at substantially the same time as, deduplication of the data that is to be backed up.

Once a deduplicated backup has been created, the backup application 204 can then communicate the deduplicated backup to the storage node 400. In one alternative embodiment, the backup may first be created by cooperation of the backup application 204 and backup clients 304 and, subsequently, deduplication can be performed on that backup. The deduplicated backup(s) can then be communicated to the storage node 400.

It should be noted that creation of the backup and deduplication can be performed in connection with a measurement process that measures the physical space used by, or expected to be used by, the deduplicated data or a portion thereof, such as an ad-hoc subset of files. The measurement process can be performed by any entity, or group of entities. Thus, in some embodiments, the measurement process is performed by the deduplication server 250 and, in other embodiments, the measurement process is performed by the backup server 200. In still other embodiments, the measurement process is performed by an entity other than the backup server 200 or deduplication server 250.

In more detail, in some embodiments, the deduplicated data is evaluated by a measurement engine such as measurement engine 202. Additionally, or alternatively, the physical space requirements of an ad-hoc subset of files of the backup can be measured. As discussed in more detail elsewhere herein, the ad-hoc subset (or subsets) of files to be evaluated may be defined within the scope of a particular backup, or may span an entire protection storage system, or other file system.

In some embodiments, the measurement engine 402 at the storage node 400 is operable to measure the physical storage space for any ad-hoc subset of the files in a protection storage system, or other file system. The measurement process, in general, can be performed at any of a variety of different times including, as the data is deduplicated, in-line as backup data is stored at the storage node, or after the backup data has been stored at the storage node.

As the foregoing non-limiting examples demonstrate, functionalities relating to physical space measurements for data can be concentrated in a single entity, or dispersed amongst a plurality of entities. Accordingly, the scope of the invention should not be limited to any particular allocation of functions relating to measurement of physical space requirements for data.

With continued reference to FIG. 1, the physical space measurement processes performed by the measurement engine 202 and/or measurement engine 402 can be initiated in various ways. For example, a request for measurement of the physical space associated with an ad-hoc set of files can be made ad-hoc by a user using a command line or graphical user interface (GUI). Thus, such a request may originate at a client 300 or at a backup server 200, for example. A request for measurement of the physical space associated with an ad-hoc set of files can additionally or alternatively be made automatically on a recurring basis, such as every day, week, month or any other time period. As well, a measurement can be made automatically without any command or input from user in order to provide input data for another internal process. For example, the output of this method, that is, physical space measurements, can be used as input to another method, such as a method that automatically tries to minimize physical space utilization, for example, across different disaster recovery systems, machines, nodes, and/or partitions. One example of such a disaster recovery system is the EMC Data Domain Replicator, although the scope of the invention is not so limited.

B. Example Host Configuration

Figure 2:
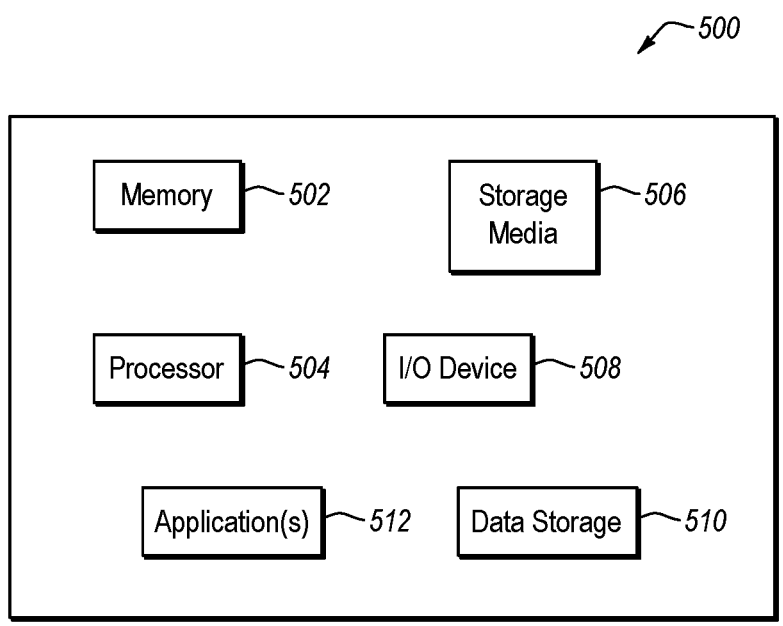
FIG. 2 discloses aspects of an example host configuration.

With reference briefly to FIG. 2, one or more of the backup server 200, deduplication server 250, clients 300, or storage node 400 can take the form of a physical computing device, one example of which is denoted at 500. In the example of FIG. 2, the physical computing device 500 includes a memory 502, one or more hardware processors 504, non-transitory storage media 506, I/O device 508, and data storage 510. As well, one or more applications 512 are provided that comprise executable instructions. Such executable instructions can take the form, for example, of one or more of a backup application, a backup client, a measurement engine, or a deduplication application.

C. General Aspects of Some Example Methods

As noted earlier, example embodiments of the invention are directed to an efficient and accurate physical space measurement mechanism that has an efficient and accurate way to track the set of unique segments for any subset of files in the file system. To illustrate with reference to one example embodiment, the unique segments of a file F can be denoted as the set $U_F$. A physical space measurement method and/or mechanism according to example embodiments, such as a measurement engine for example, in a file system with data deduplication and segmentation is able to compute $U_{\{F1, F2, \ldots, FN\}} = U_{F1} \cup U_{F2} \cup \ldots \cup U_{FN}$.

Moreover, this computation can be performed for any ad-hoc subset of N files in the file system.

More specifically, the physical space of files $\{F1, F2, \ldots, FN\}$ can be computed by summing the sizes of the segments inside $U_{\{F1, F2, \ldots, FN\}}$. Denoting any segment in a deduplicated file system as s, and its physical space as physical_space($s_1$), the physical_space(s) can be easily computed given the post-compression size of the segment s, during the time it was written. Then the following will be true:

$U_{\{F1, F2, \ldots, FN\}} = \{s_1, s_2, \ldots, s_m\}$, in which $\{s_1, s_2, \ldots, s_m\}$ is the set of unique segments in the system for files $\{F1, F2, \ldots, FN\}$, and physical_space($\{F1, F2, \ldots, FN\}$)=physical_space($s_1$)+ physical_space($s_2$)+ . . . +physical_space($s_m$).

Thus, embodiments of the invention are directed to systems and methods that can compute physical_space($\{F1, F2, \ldots, FN\}$) efficiently for any ad-hoc subset of files $\{F1, F2, \ldots, FN\}$. More particularly, embodiments of the invention must be able to, first, efficiently track the unique segments shared across these files, in order to be able to compute the physical space required by any ad-hoc subset of files.

Figure 3:
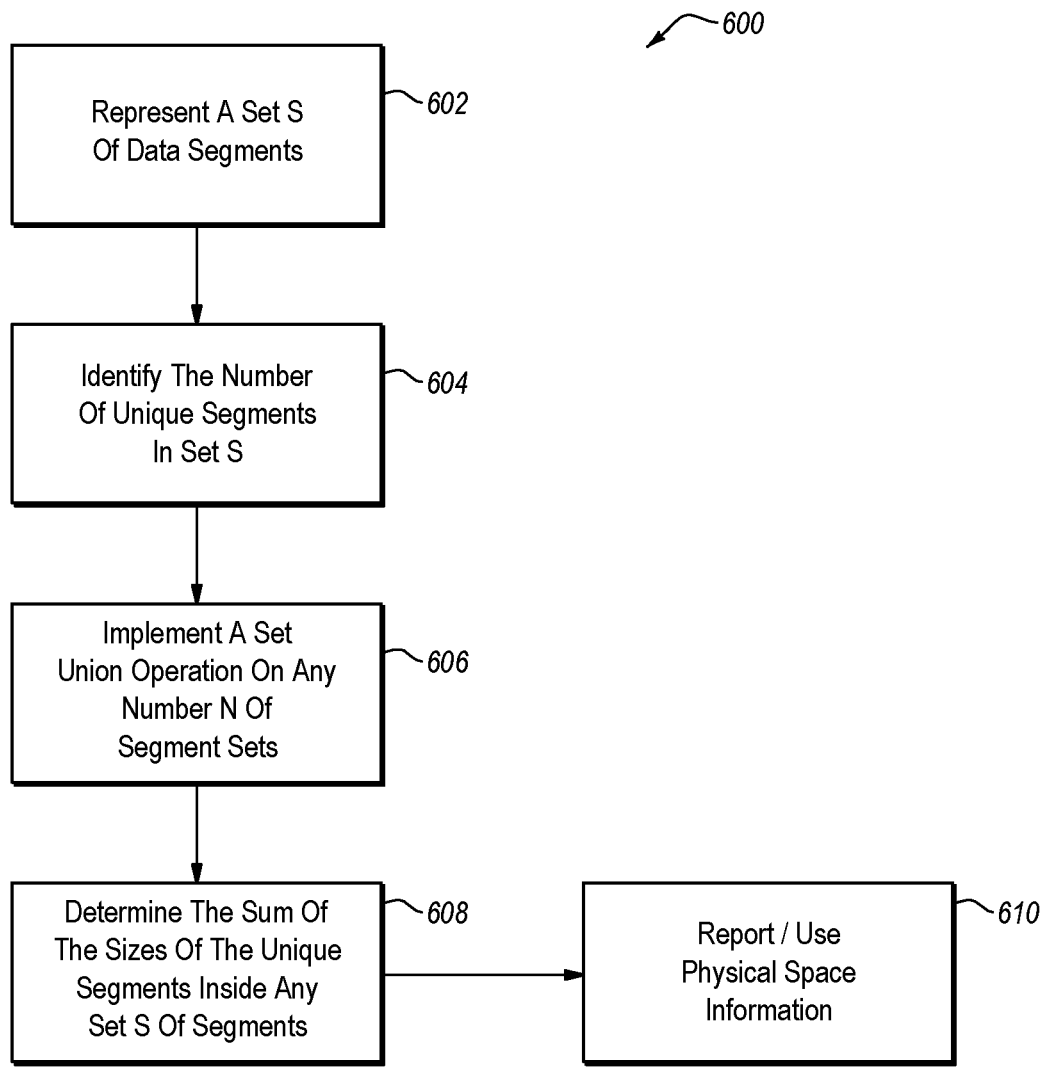
FIG. 3 is a flow diagram that discloses some basic aspects of an example method for determining a physical space requirement for an ad-hoc group of files.

With reference now to FIG. 3, details are provided concerning a method for tracking unique segments shared across a group of files. One example of such a method is denoted generally at 600. Some, or all, of the method 600 can be performed in memory. Further details concerning each of the processes in method 600 are set forth below following the discussion of FIG. 3.

In general however, the method 600 can begin by representing 602 a set S of data segments. There is no limit to the number of data segments that can be included in the set S. In some embodiments, the number of data segments in S is quite large, numbering in the hundreds of billions of segments, although larger or smaller sets S can also be employed and the scope of the invention is not limited to any particular size or sizes of sets S.

Next, the number of unique segments in S is determined 604. These unique segments for a particular file F can be denoted as the set $U_F$. As discussed in further detail below, performance of the process 604 can involve the use of non-random statistical sampling, such as content-based sampling for example, to estimate the number of unique segments in S. However, any other techniques of comparable functionality could alternatively be employed.

After the number of unique segments in S has been determined at 604, a set union operation can then be performed 606 on any number N of unique segment sets, where there is a unique segment set U for each of N files in the group of ad-hoc files. More particularly, implementation of the set union operation can be as follows:

$U_{\{F1, F2, \ldots, FN\}} = U_{F1} \cup U_{F2} \cup \ldots \cup U_{FN}$

When the number of unique segments in S has been determined, the sum of the sizes of the unique segments inside any set of segments S can then be determined 608. The sum of the sizes of the unique segments is the size of the physical space needed, or occupied, by the N files in the group of ad-hoc files.

Finally, the physical space information can be reported 610 to one or more consumers. The consumers may include, for example, administrative personnel, and/or other users such as methods, processes and programs for example. The consumers of the physical space information may use that information for any of a variety of purposes, including to perform various decision making processes such as charging customers based on physical space usage, to perform capacity planning and to identify datasets that do not deduplicate well so that the datasets can be moved to a different system.

D. Details of Some Example Methods

With continued attention to FIG. 3, more particular details are provided concerning various aspects of methods, such as the example method 600. As noted above, one aspect of the method 600 is the representation of a set S of data segments 602. In some environments that employ stream segmentation and segment deduplication, the data segments can be represented as fingerprints. For example, an EMC Corp. Data Domain Restorer (DDR) appliance, which may be used as a Purpose Built Backup Appliance (PBBA), will represent each segment as a content-based fingerprint that can be stored and uniquely referred to with a few bytes.

Given the potentially large size of the data set S however, it may be desirable to use a smaller, or alternative, representation of a segment for in an in-memory representation of a set of fingerprints S. By way of illustration, even if each fingerprint were represented with only 1 byte, about 93 GB of memory would be needed in order to represent 100 billion segments. Thus, a more compact in-memory representation of the set of fingerprints S would be useful in at least some implementations.

One way to achieve such a representation is based on the notion that the average segment size for a file can be obtained independently of the unique segment count for a file during the physical space computation:

physical_space(F)=average_segment_size(F)× unique_segment_count(F)

This relationship is true where, for example, the segments have a fixed average size encoded in the segmentation algorithm itself. In other cases, the average segment size can be estimated using an arithmetic mean across the unique segments of the file. If it is assumed, for example, that the segment sizes are statistically independent of the probability of a segment being deduplicated, that is, relatively small segments do not deduplicate more often or less often than relatively large segments, then the average segment size can simply be estimated as the arithmetic mean of all segments of the file F, rather than simply estimating the arithmetic mean of only the unique segments of the file.

More particularly, a statistical segment counting method can be employed that estimates the number of unique segments while using a very small amount of memory. The unique segment counting in-memory data structure can also be packed and stored on disk in a compact data structure. This data structure is computed and stored on a per-file basis. One useful aspect of this approach is that it allows the method to build up a physical space measurement based on any ad-hoc set of files in the file system using pre-computed, on-disk data structures.

Further, as the foregoing discussion concerning physical_space(F) indicates, there is no need to count all of the segments in a file or group of files in order to determine the physical_space requirement for an ad-hoc set of files. Rather, it is enough to determine the average segment size, as set forth above, and the unique segment count, which will now be discussed.

In particular, and with reference to the process 604 of FIG. 3, statistical sampling can be used to estimate the number of unique segments, that is, the function unique_segment_count (F). If the sampling rate is 1/R, that is, only 1 segment in each R segments is tracked, the real number of unique segments for a file F is estimated as:

unique_segment_count (F)=R*sampled_unique_segment_count(F)

An important aspect of the sampling method is that it should not underestimate unique_segment_count (F). Thus, segments cannot be sampled randomly, such as with pseudo-randomization algorithms such as rand( ). Instead, the segments should be sampled non-randomly. For example, the segments can be sampled using the content-based fingerprint value.

One way to do this is to create a sampling mask that matches the last 'b' bits of the fingerprint so that the sampling rate is equal to $½^b$. In general, the sampling mask is an example of a mechanism for screening segments to determine whether or not those segments should be sampled. For example, in case of 1/512 sampling, b=9. The last bits can then be matched against a sampling pattern 'p.' For example, if b=9 and p=0, the sampling condition will be:

(fingerprint % ($2^b$−1)==0)

One pre-condition for at least some embodiments of the sampling method is that the sampling condition for all fingerprints of a file F should be able to be tested, even if they are not actually tested in the execution of the sampling method. This approach involves the enumeration of all fingerprints for the file by following all segment pointers without skipping any pointer. This may involve a full metadata scan for the file F.

In at least some embodiments, sampled_unique_segment_count(F) can be implemented using a bloom filter with a single hash function. In particular, the bloom filter is a bitmap that represents a set with insert( ) and lookup( ) operations but no remove( ) operation. That is, the bloom filter flips bits from 0 to 1 but not from 1 to 0. An example a for insert( ) operation into a bloom filter is as follows:

1. function insert(fingerprint fp)
2. B[hash(fp)]=1

It should be noted that bloom filters are known to have a false positive rate that exists due to hash collisions, that is, when two or more different fingerprints may map to the same bit. However, since in this case the lookup( ) operation is not implemented, the false positive rate does not necessarily need to be low, rather, the false positive rate only needs to be analytically estimated with relatively high accuracy. If the hash function is a uniform function, the number of unique items inserted into the bloom filter can be estimated by using the equation:

sampled_unique_segment_count(F)=−M×ln(z/M)

in which M is the total number of bits in the bloom filter bitmap and z is the proportion of bits with value equal to 0. Thus, for example, if the bloom filter has 10 bits and 2 are zero after all fingerprints are inserted, then z=2/10=0.2.

If one bloom filter with bitmap $B_F$ is created per file F using the method described above, the individual bitmaps for the files in the ad-hoc set can be used as building blocks in order to efficiently estimate the number of unique segments inside any set of files {F1, F2, . . . , FN}. In this case, if two or more files share segments across them, each segment will be counted only once, so an estimate can be made as to how much physical_space has actually been written. Moreover, and as indicated by process 606 of FIG. 3, two or more bloom filters for a number N of files can be readily combined by using a bitwise or operation on the bloom filter bitmaps. For example, given the bitmaps for file F1 and file F2, those bitmaps can be combined thus:

$B_{\{F1,F2\}} = B_{F1} / B_{F2}$

The aforementioned technique can be used to build up any ad-hoc measurement for any subset of the files in the file system by combining the bitmaps of all the files inside the subset. The only pre-requisites are that (1) the bitmaps should have the same number M of bits, (2) the bloom filter hash function should be the same across the bitmaps, and (3) the sampling method used for fingerprints should be the same across the bitmaps.

Because some ad-hoc file sets may be relatively large, it is helpful to be able to execute the physical space measurement associated with the files in such sets quickly and efficiently. Thus, example embodiments of the method cache the bloom filters and associated statistics for every file in the system. The method can use a BTree or any other indexing mechanism in order to return the bloom filters and associated statistics for any file part of the measurement. As long as the bloom filters are cached, the measurement can be as simple as combining the statistics and bloom filters for each file in the subset of files being measured, without requiring any further access to the original set of segment fingerprints for the files being measured.

In more detail, embodiments of the method are incremental in the sense that the segment fingerprints only need to be enumerated if the file measurement has not already been cached. The fingerprint enumeration and the computation that takes place before the cached measurements are stored constitute the bulk of the computation cost of the method. This means that every time a measurement is made, measurement is only necessary for the new and the modified files in the subset of files being measured.

Example embodiments of the method also allow the efficient measurement of any point-in-time snapshot of any subset of the files in the file system. One way this is achieved is by creating point-in-time snapshots not only of the files but also of the pre-computed measurement caches. Each pre-computed measurement cache is stored together with the file i-nodes so that a point-in-time snapshot of the pre-computed measurement caches is stored whenever a point-in-time snapshot of the associated file is stored.

Moreover, since the bloom filters are stored in persistent storage and in memory, there is a need to be able to efficiently compact the bitmaps sizes to enable efficient storage of one cache measurement per file. One way this can be achieved is by using a sparse representation for the bitmap. For example, instead of representing the bitmap as a sequence of bits 1s and 0s, if the number of 1s is very low compared to the number of 0s, the 1s can be represented as a series of offsets inside the bitmap. Thus, if only bit offset 2 and bit offset 3 are set to 1 in a bitmap of size 4, the bitmap can be represented compactly as a sequence [2,3] instead of [0,1,1,0].

As well, any form of encoding can be applied to increase the compressibility of the bitmaps. One example is delta encoding, in which the offset of each bit set to 1 can be represented in the bitmap using deltas, that is, differences. For example, [2,4] can be represented as [2,2], since 4=2+2. Moreover, any kind of lossless data compressor can additionally be applied, examples of which include the lossless data compressors from the Lempel-Ziv family of compressors. In general, the bloom filters are stored/cached for future use, and are compressed/encoded so that their footprints are small and that their sizes are proportional to the size of the file. Thus, the end result of these processes is that the actual amount of data required to be stored is proportional to the number of sampled segments in a file. Thus, smaller files will have a very small stored bitmap, while larger files will have larger bitmaps.

E. An Example Method for Estimating Unique Segments

With the foregoing discussion, and FIG. 3, in view, further details are now provided concerning an example method for determining the number of unique segments in an ad-hoc set of files whose physical space requirement is to be determined. As noted earlier, the physical space value is a function of the number of unique segments:

physical_space(F)=average_segment_size(F)×unique_segment_count(F)

As well, the unique segment count is determined based on a sample, thus:

unique_segment_count(F)=R*sampled_unique_segment_count(F)

Figure 4:
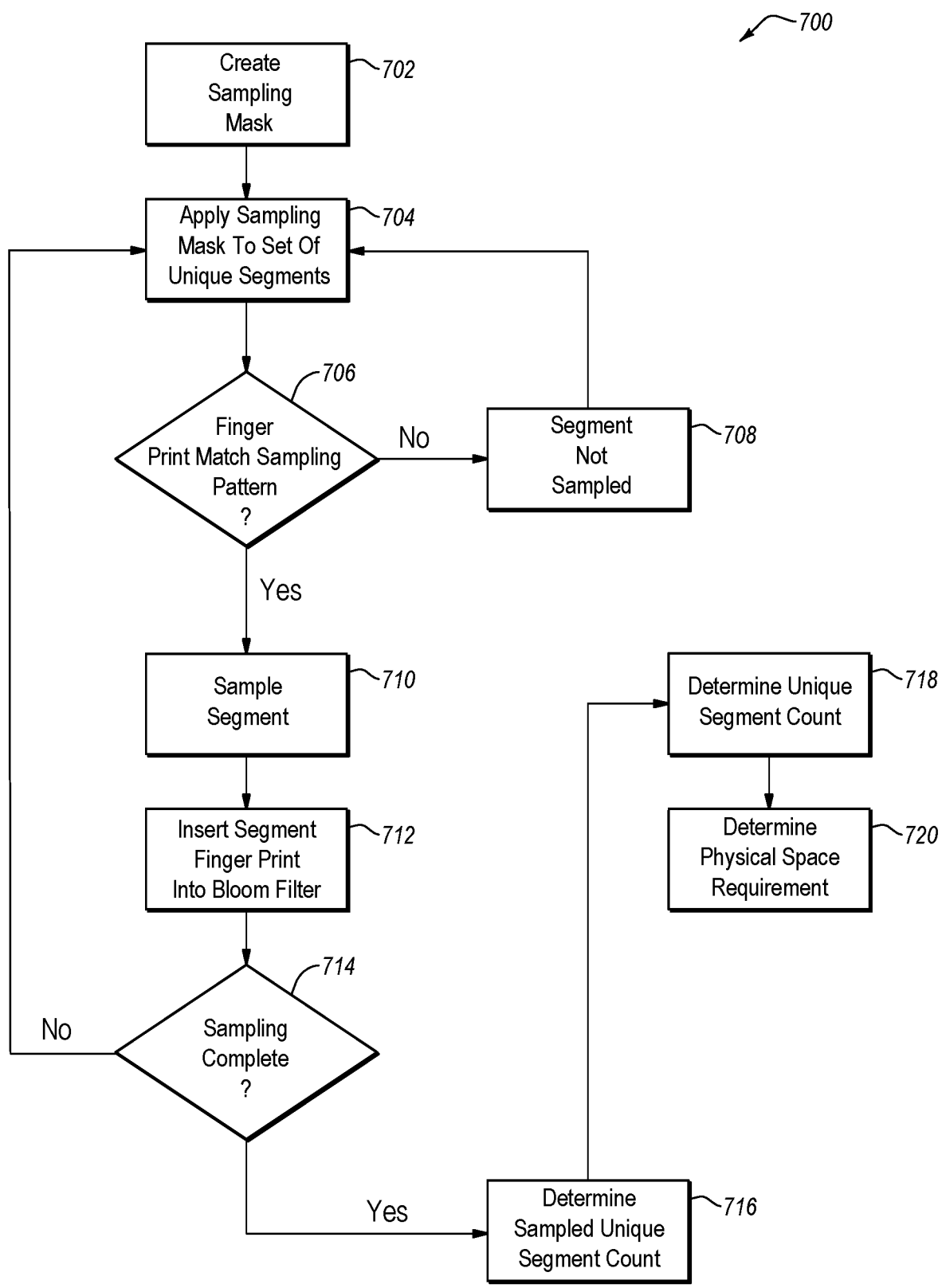
FIG. 4 is a flow diagram that discloses aspects of an example method that uses sampling to facilitate determination of a physical space requirement for an ad-hoc group of files.

With reference now to FIG. 4, one example of a method for determining the number of unique segments in an ad-hoc set of files is denoted generally at 700. In general, the method 700 is operable to make this determination on a non-random basis and, as such, the method 700 can be based on the use of content-based fingerprints. In at least some embodiments, the fingerprint is a collision-resistant hash value computed over the content of the segment to which it corresponds. Of course, any other content-based fingerprint can alternatively be employed.

The method 700 can begin with the creation of a sampling mask 702. In general, the sampling mask is then applied 704 to a set U, such as $U_{\{F1,F2,Fn\ldots\}}$ to determine which unique segments of the set U should be sampled. It should be noted here that in order for the sampling method to produce reliable results, the sampling condition should be able to be used for all of the fingerprints of the involved file(s) F.

As noted elsewhere herein, the set U can contain, for example, all the unique data segments of an ad-hoc group of files. Application of the sampling mask can involve determining 706 whether or the last 'b' bits of a fingerprint match a sampling pattern 'p,' where the sampling rate=$1/2^b$. If a match is not found, the segment associated with that fingerprint is not sampled 708, and the method 700 returns to 704. On the other hand, if the application of the sampling mask indicates that there is a match, for example between the last 'b' bits of a fingerprint and sampling pattern 'p,' then the segment associated with the fingerprint is sampled 710 and the fingerprint of that segment inserted 712 into a bloom filter.

Next, if sampling of the set U is not completed 714, then the method 700 can return to 704. On the other hand, if sampling of the set U is completed 714, then the method 700 can advance to 716 where the sampled unique segment count is determined 716. With this information, the unique segment count can then be determined 718, for example by using the relationship, where R is the sampling ratio:

unique_segment_count(F)=R*sampled_unique_segment_count(F)

Finally, the physical_space requirement can be determined 720, for example, by using the following relationship:

physical_space(F)=average_segment_size(F)×unique_segment_count(F)

It will be appreciated that a variety of processes can be used to implement embodiments of a method such as the method 700. One example of such a process is set forth below. While the process set forth below includes various elements not specifically illustrated in the method 700, it should be understood that other embodiments of the invention that is exemplified by the method 700 can include any element or elements of the aforementioned process that is set forth below.

As noted earlier, at least some embodiments of the invention involve various preconditions and/or assumptions underlying the methods disclosed herein. With particular reference to the example process set forth below, such preconditions and/or assumptions are as follows: 1. The file system has stream segmentation and deduplication; 2. The segments are identified by content-based fingerprints; 3. The physical space for each segment can be obtained by enumerating system metadata; and, 4. The probability of a segment being deduplicated is independent of the physical In general, the process set forth below can be used to measure a physical space that is, or will be, occupied by an ad-hoc set of files. In particular, the primary inputs are: a set of N files {F1, F2, . . . , FN}; and, a sampling rate for fingerprints (sampling_rate). The output of the process is: The physical space $p_{\{F1, F2, \ldots, FN\}}$.

Elements of an example process:

1. Initialize global bitmap for the measurement ($B_{global}$)
2. Initialize the global sum of sizes of segments ($S_{global}$ = 0)
3. Initialize the global number of segments found ($E_{global}$=0)
4. For each file F in {F1, F2, ..., FN }
5.    If measurement for F is pre-computed and cached
6.       Fetch $B_F$, $S_F$ and $E_F$ from cache
7.    Else if measurement for F is still not pre-computed or cached
8.       Initialize file F bitmap for the measurement ($B_F$)
9.       Initialize sum of sizes of segments for file F ($S_F$ = 0)
10.       Initialize number of segments found for file F ($E_F$ = 0)
11.       For each segment fingerprint f found in file F
12.          If fingerprint f matches the sampling pattern
13.             Add fingerprint f into $B_F$
14.             Add fingerprint physical size into $S_F$ ($S_F$ = $S_F$ + size(f))
15.             Increment number of fingerprints found $E_F$ ($E_F$ = $E_F$ + 1)
16.          Compress and store $B_F$, $S_F$ and $E_F$ into cache for future access
17. $B_{global}$ = $B_{global}$ | $B_F$
18. $S_{global}$ = $S_{global}$ + $S_F$
19. $E_{global}$ = $E_{global}$ + $E_F$
20. M = total number of bits in $B_{global}$
21. z = proportion of bits equal to 0 in $B_{global}$
22. sampled_unique_fingerprints = −M × ln(z/M)
23. unique_fingerprints = (1/sampling_rate) × sampled_unique_fingerprints
24. average_segment_size = $S_{global}$/ $E_{global}$
25. p = average_segment_size × unique_fingerprints

F. Example Bitmap and Bloom Filter Methods

Figure 5:
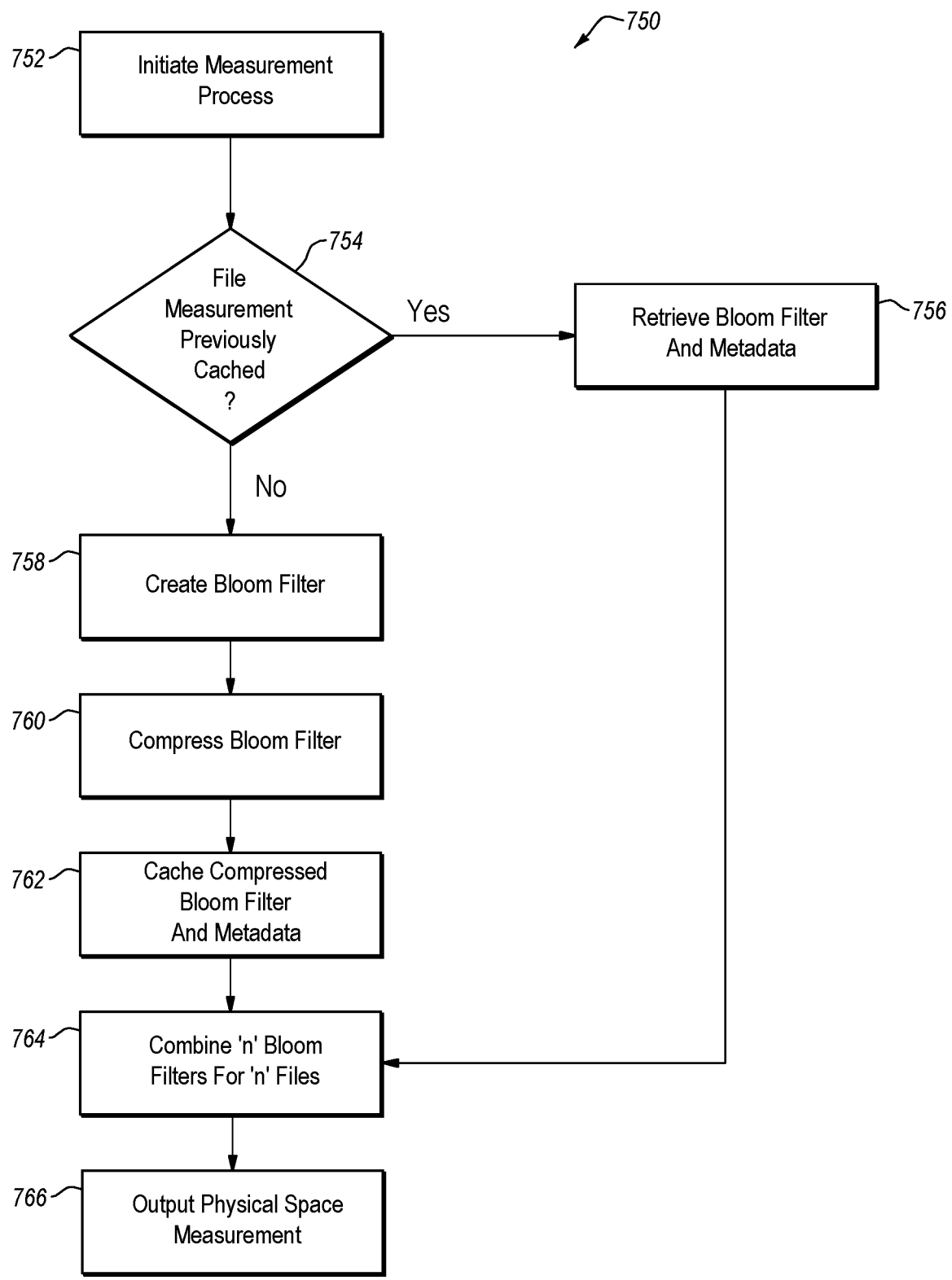
FIG. 5 is a flow diagram that discloses aspects of an example method for creating and handling bloom filters and bitmaps.

With attention now to FIG. 5, details are provided concerning methods for the creation and use of bitmaps in connection with methods for measuring the physical space associated with an ad-hoc group of files. One example of such a method is denoted generally at 750. In general, some example processes that can be performed with regard to bitmaps include bitmap creation, bitmap compression, bitmap storage, and bitmap combination, although additional and/or alternative processes can also be performed.

The example process 750 can begin with the initiation 752 of a physical space measurement process. Initially, a check can be performed 754 to determine if file measurements for any of the files in the ad-hoc group of files have previously been cached. If so, the cached measurement information, which may be in the form of one or more file-specific bloom filters and associated metadata, is retrieved 756.

On the other hand, if file measurement information has not previously been cached for one or more of the files in the ad-hoc group, a bloom filter is created 758 for each of such files, and one or more fingerprints inserted into each of the created bloom filters, as discussed for example in connection with FIG. 4. Creation of the bloom filters 758 may involve enumerating segment fingerprints for each file for which a bloom filter is created. In at least some embodiments, a bloom filter is specific to a particular file F in an ad-hoc group of files such that 'n' bloom filters are created for an ad-hoc group of files that consists of 'n' files. Thus, respective instances of the method 750 can be performed for each of a plurality of files, serially or substantially simultaneously.

After the bloom filters have been created, they can be compressed 760 for storage. Any suitable compression technique(s) can be employed. In at least some embodiments, a lossless compression process is used to compress the bloom filter. After the bloom filter has been compressed 760, the compressed bloom filter and any associated metadata can be cached 762 for later retrieval and access.

When a physical space measurement process is requested, the cached bloom filter and metadata can be retrieved and combined 764 with one or more other bloom filters. As noted herein, a BTree or other indexing mechanism can be used to return the various bloom filters and metadata needed. The combination of the bitmaps for the bloom filter produces a physical space measurement. As noted earlier, the bitmaps can be combined using the following relationship: $B_{\{F1,F2\}} = B_{F1}/B_{F2}$. Finally, the physical space measurement can be output 766 to one or more consumers.

In connection with the foregoing discussion, it will be appreciated that compression of the bloom filters can be achieved by way of a variety of different processes. One example of such a process is set forth below. While the process set forth below includes various elements not specifically illustrated in the method 750, it should be understood that other embodiments of the invention that is exemplified by the method 750 can include any element or elements of the aforementioned process that is set forth below.

In general, the process set forth below can be used to compress a bitmap associated with a particular file F. In particular, the primary input is an uncompressed bitmap $B_F$, and the primary output is a compressed bitmap $C_F$.

Elements of an example process:

1. Initialize list of offsets $L_F$ ($L_F$ = [ ])
2. Initialize integer previous_offset = 0
3. For each bit b in bitmap $B_F$
4.    If b is equal to 1
5.       Add bit offset to the list of offsets ($L_F$ = $L_F$ . [offset(b)−previous_offset])
6.       previous_offset = offset(b)
7. Compress list of offsets $L_F$ into $C_F$ with a lossless algorithm

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
for a dataset S comprising segments, measuring an amount of physical storage space used, or expected to be used, by a subset of the segments, the subset of the segments corresponding to an ad-hoc group of size 'n' of files $F_1 \ldots F_n$ that are included in the dataset S, wherein 'n' is any whole integer that is greater than zero and less than, or equal to, a total number of files in the dataset S, and wherein measuring the amount of physical storage space comprises:
selecting, as between respective first and second representations of the subset of the segments in the dataset S, whichever of the first representation and the second representation consumes relatively less computing memory than the other of the first representation and the second representation;
generating the selected representation;
storing the selected representation in the computing memory;
based on the selected representation, determining a number of unique segments in the dataset S by performing operations comprising:
identifying a respective unique segment set $U_{F1} \ldots U_{FN}$ for each of the 'n' files in the ad-hoc group of files; and
performing a set union operation $U_{\{F1 \ldots Fn\}}$ on the unique segment sets $U_{F1} \ldots U_{FN}$;
determining a sum of sizes of the unique segment sets $U_{F1} \ldots U_{FN}$, wherein the sum is the amount of physical storage space used or expected to be used by the ad-hoc group of size 'n' of files $F_1 \ldots F_n$; and
using the sum of physical storage space as a basis for minimizing physical data storage utilization in a computing system.

2. The method as recited in claim 1, wherein determining the unique segment set for one of the 'n' files comprises performing a non-random statistical sampling of the segments in the dataset S.

3. The method as recited in claim 2, wherein the non-random statistical sampling comprises content-based sampling.

4. The method as recited in claim 1, wherein the method is performed in memory.

5. The method as recited in claim 1, further comprising reporting, to a consumer, the amount of physical storage space used or expected to be used by the ad-hoc group of size 'n' of files $F_1 \ldots F_n$.

6. The method as recited in claim 1, wherein the amount of physical storage space used or expected to be used by the ad-hoc group of size 'n' of files $F_1 \ldots F_n$ is determined without counting all of the segments in the ad-hoc group of size 'n' of files $F_1 \ldots F_n$.

7. The method as recited in claim 1, wherein the dataset is a segmented and deduplicated dataset.

8. The method as recited in claim 1, wherein determining a sum of sizes of the unique segment sets $U_{F1} \ldots U_{FN}$ comprises determining an average size of at least some segments in each of the 'n' files.

9. The method as recited in claim 8, wherein, for each of the 'n' files, determining an average size of at least some segments in the file comprises estimating the average size of segments in that file as being an arithmetic mean of all segments in that file.

10. A non-transitory storage medium having stored therein computer-executable instructions which, when executed by one or more hardware processors, perform the operations:

for a dataset S comprising segments, measuring an amount of physical storage space used, or expected to be used, by a subset of the segments, the subset of the segments corresponding to an ad-hoc group of size n of files $F_1 \ldots F_n$ that are included in the dataset S, wherein n is any whole integer that is greater than zero and less than, or equal to, a total number of files in the dataset S, and wherein measuring the amount of physical storage space comprises:

selecting, as between respective first and second representations of the subset of the segments in the dataset S, whichever of the first representation and the second representation consumes relatively less computing memory than the other of the first representation and the second representation;

generating the selected representation;

storing the selected representation in the computing memory;

based on the selected representation, determining a number of unique segments in the dataset S by performing operations comprising:

identifying a respective unique segment set $U_{F1} \ldots U_{FN}$ for each of the 'n' files in the ad-hoc group of files; and performing a set union operation $U_{\{F1 \ldots Fn\}}$ on the unique segment sets $U_{F1} \ldots U_{FN}$; determining a sum of sizes of the unique segment sets $U_{F1} \ldots U_{FN}$, wherein the sum is the amount of physical storage space used or expected to be used by the ad-hoc group of size n of files $F_1 \ldots F_n$; and using the sum of physical storage space as a basis for minimizing physical data storage utilization in a computing system.

11. The non-transitory storage medium as recited in claim 10, wherein determining the unique segment set for one of the 'n' files comprises performing a non-random statistical sampling of the segments in the dataset S.

12. The non-transitory storage medium as recited in claim 11, wherein the non-random statistical sampling comprises content-based sampling.

13. The non-transitory storage medium as recited in claim 10, wherein the operations are performed in memory.

14. The non-transitory storage medium as recited in claim 11, further comprising reporting, to a consumer, the amount of physical storage space used or expected to be used by the ad-hoc group of size 'n' of files $F_1 \ldots F_n$.

15. The non-transitory storage medium as recited in claim 10, wherein the amount of physical storage space used or expected to be used by the ad-hoc group of size 'n' of files $F_1 \ldots F_n$ is determined without counting all of the segments in the ad-hoc group of size 'n' of files $F_1 \ldots F_n$.

16. The non-transitory storage medium as recited in claim 10, wherein the dataset is a segmented and deduplicated dataset.

17. The non-transitory storage medium as recited in claim 11, wherein determining a sum of sizes of the unique segment sets $U_{F1} \ldots U_{FN}$ comprises determining an average size of at least some segments in each of the 'n' files.

18. The non-transitory storage medium as recited in claim 17, wherein, for each of the 'n' files, determining an average size of at least some segments in the file comprises estimating the average size of segments in that file as being an arithmetic mean of all segments in that file.

* * * * *